United States Patent
Keihl et al.

(10) Patent No.: US 8,274,008 B2
(45) Date of Patent: Sep. 25, 2012

(54) EDM SPINDLE ASSEMBLY WITH FLUID SEAL

(75) Inventors: Jonathan J. Keihl, Versailles, OH (US); Kevin G. Herzog, Eaton, OH (US)

(73) Assignee: Lam Research Corporation, Fremont, CA (US)

( * ) Notice: Subject to any disclaimer, the term of this patent is extended or adjusted under 35 U.S.C. 154(b) by 1006 days.

(21) Appl. No.: 12/251,997

(22) Filed: Oct. 15, 2008

(65) Prior Publication Data

US 2010/0089876 A1    Apr. 15, 2010

(51) Int. Cl.
*B23H 1/00* (2006.01)
*B23H 7/26* (2006.01)

(52) U.S. Cl. .................. 219/69.15; 219/69.14

(58) Field of Classification Search ............... 219/69.11, 219/69.14, 69.15, 69.2; 204/224 M; 408/56, 408/57, 58, 59, 60, 61
See application file for complete search history.

(56) References Cited

U.S. PATENT DOCUMENTS

| | | | |
|---|---|---|---|
| 3,939,321 A | 2/1976 | Bertrand et al. | |
| 5,420,388 A | 5/1995 | Girardin | |
| 5,567,093 A * | 10/1996 | Richmond | 408/57 |
| 5,585,013 A | 12/1996 | Truty | |
| 5,977,503 A * | 11/1999 | Leach et al. | 219/69.15 |
| 6,403,910 B1 | 6/2002 | Stang et al. | |
| 7,048,481 B2 * | 5/2006 | Sugata et al. | 408/56 |
| 2003/0103819 A1 * | 6/2003 | Sugata et al. | 408/57 |

FOREIGN PATENT DOCUMENTS

JP    3-60930 A  *  3/1991

OTHER PUBLICATIONS

International Search Report and Written Opinion dated May 6, 2010 pertaining to International application No. PCT/US2009/057421.

* cited by examiner

*Primary Examiner* — Geoffrey S Evans
(74) *Attorney, Agent, or Firm* — Dinsmore & Shohl, LLP

(57) ABSTRACT

An EDM spindle assembly is provided comprising a pull stud, an electrode holder, a fluid seal, and a seal holder. A threaded outside diameter of the seal holder is threadedly engaged with a threaded inside diameter of a counter bore formed in the tail end of the electrode holder. A threaded outside diameter of the pull stud is threadedly engaged with the threaded inside diameter of the counter bore. The threaded inside diameter of the counter bore in the electrode holder comprises a longitudinal threading dimension that is sufficient to accommodate the entire longitudinal threaded outside diameter of the seal holder and a portion of the longitudinal threaded outside diameter of the pull stud sufficient to create threaded engagement, with the fluid seal positioned in the seal accommodating space.

17 Claims, 3 Drawing Sheets

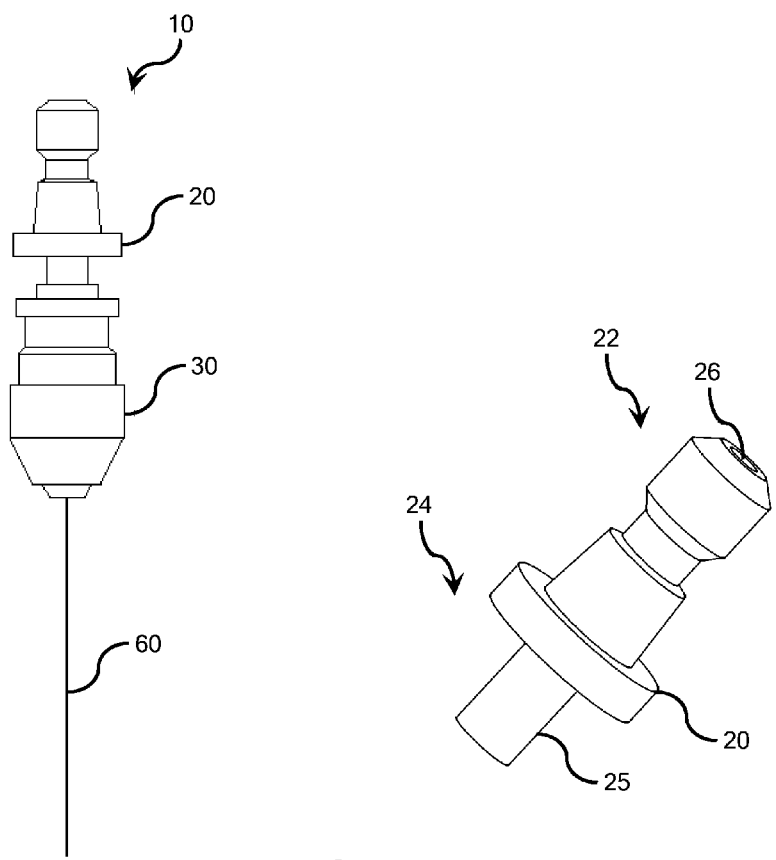
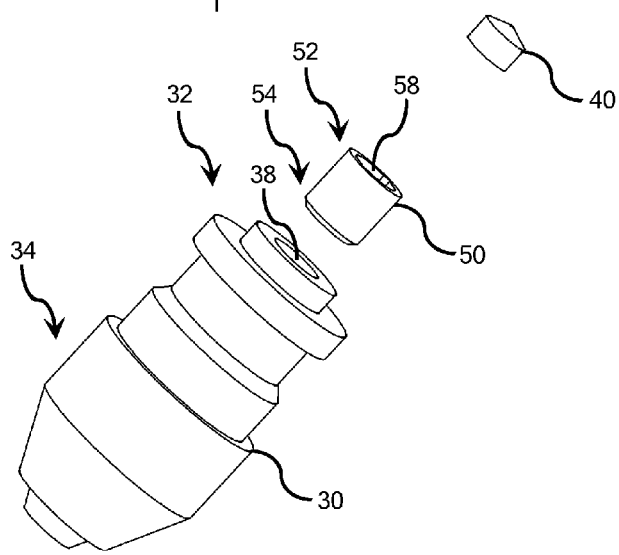
Fig. 1
Fig. 2

EDM SPINDLE ASSEMBLY WITH FLUID SEAL

BACKGROUND OF THE INVENTION

The present invention relates to electrical discharge machining (EDM) devices and, more particularly, to EDM spindle assemblies comprising improved fluid seals.

BRIEF SUMMARY OF THE INVENTION

According to the present disclosure, an EDM spindle assembly is provided comprising an improved seal configuration. The improved seal is particularly well-suited for sealing the periphery of an EDM electrode against coolant leakage or flush fluid leakage.

In accordance with one embodiment of the present invention, an EDM spindle assembly is provided comprising a pull stud, an electrode holder, a fluid seal, and a seal holder. The electrode holder comprises a tail end, a nose end, and an electrode accommodating passage extending from the tail end to the nose end of the electrode holder. A counter bore comprising a threaded inside diameter is formed in the tail end of the electrode holder and is aligned with the electrode accommodating passage of the electrode holder. The seal holder comprises a threaded outside diameter, a tail end, a nose end, and an electrode accommodating passage extending from the tail end to the nose end of the seal holder. The seal accommodating space is formed in the tail end of the seal holder and is aligned with the electrode accommodating passage of the seal holder. The threaded outside diameter of the seal holder is suitable for threaded engagement with the threaded inside diameter of the counter bore. The pull stud comprises a threaded outside diameter, a tail end, a nose end, and an electrode accommodating passage extending from the tail end to the nose end of the pull stud. The threaded outside diameter of the pull stud is suitable for threaded engagement with the threaded inside diameter of the counter bore. The threaded inside diameter of the counter bore in the electrode holder comprises a longitudinal threading dimension that is sufficient to accommodate the entire longitudinal threaded outside diameter of the seal holder and a significant portion of the longitudinal threaded outside diameter of the pull stud, with the fluid seal positioned in the seal accommodating space.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIG. 1 illustrates some of the primary components of an EDM spindle assembly according to one embodiment contemplated by the present disclosure;

FIG. 2 is an exploded view of some of the primary components of the EDM spindle assembly illustrated in FIG. 1;

DETAILED DESCRIPTION

Figure 3:
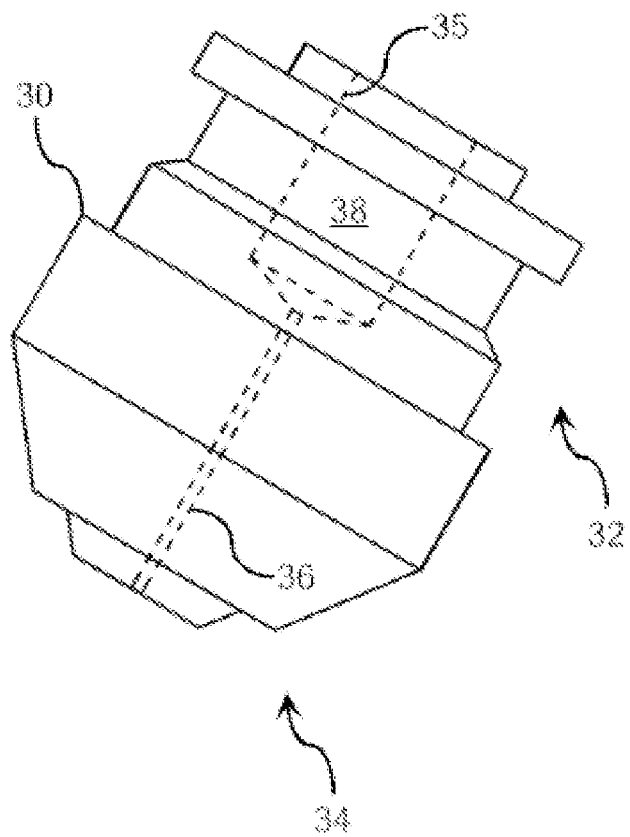
FIG. 3 is an isometric view of an electrode holder according to one embodiment contemplated by the present disclosure.

Referring initially to FIGS. 1 and 2, an EDM spindle assembly 10 according to one embodiment of the present disclosure is illustrated. Generally, the EDM spindle assembly 10 comprises a pull stud 20, an electrode holder 30, a fluid seal 40, and a seal holder 50. An EDM electrode 60 is secured by the electrode holder 30, e.g., by means of an adjustable chuck assembly incorporated into the structure of the electrode holder 30, and passes through the various components of the assembly 10. For the purposes of describing and defining the present invention, it is noted that the electrode 60 comprises internal passages for the transfer of coolant or other types of process fluids to the machining tip 62 of the electrode. The specific structure of the electrode 60, the pull stud 20, the electrode holder 30, and the parts of the EDM device utilizing the EDM spindle assembly 10, including the associated methods of operation, are beyond the scope of the present disclosure and may be gleaned from any of a variety of teachings in the art of EDM machining. The scope of the present disclosure should not be read to be limited to particular electrode, pull stud, or electrode holder configurations.

Referring to FIGS. 2 and 3, the electrode holder 30 comprises a tail end 32, a nose end 34, and an electrode accommodating passage 36 extending from the tail end 32 to the nose end 34 of the electrode holder 30. A counter bore 38 comprising a threaded inside diameter 35 is formed in the tail end 32 of the electrode holder 30 and is aligned with the electrode accommodating passage 36 of the electrode holder 30.

Figure 4:
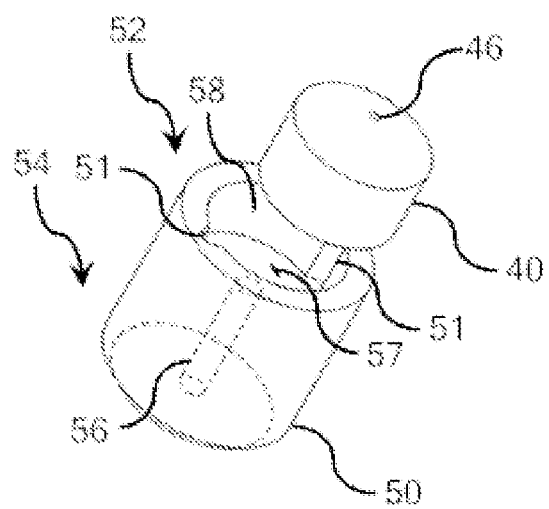
FIG. 4 is an isometric exploded view of a fluid seal and seal holder according to one embodiment contemplated by the present disclosure.

Referring to FIGS. 2 and 4, the seal holder 50 comprises a threaded outside diameter 55, a tail end 52, a nose end 54, and an electrode accommodating passage 56 extending from the tail end 52 to the nose end 54 of the seal holder 50. A seal accommodating space 58 is formed in the tail end 52 of the seal holder 50 and is aligned with the electrode accommodating passage 56 of the seal holder 50. As is illustrated in FIGS. 5 and 6, the threaded outside diameter 55 of the seal holder 50 is suitable for threaded engagement with the threaded inside diameter 35 of the counter bore 38 formed in the tail end 32 of the electrode holder 30.

Figure 5:
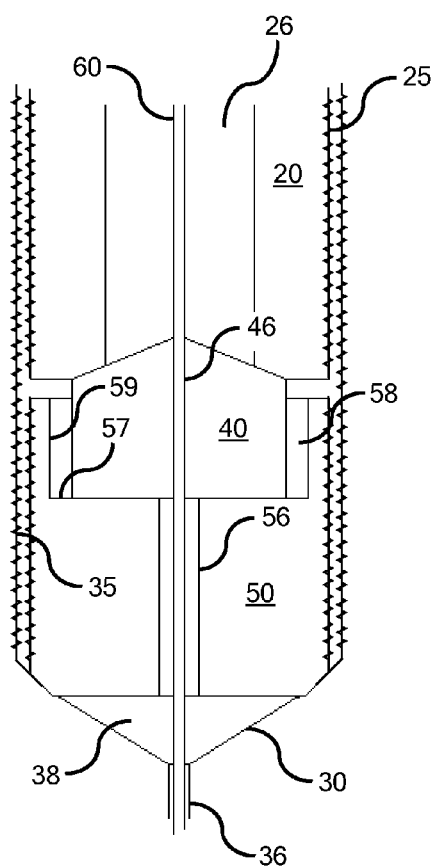
FIGS. 5 and 6 are schematic illustrations of the manner in which a seal holder and pull stud can be threaded into two different types of electrode holders according to alternative embodiments of the present disclosure.
Figure 6:
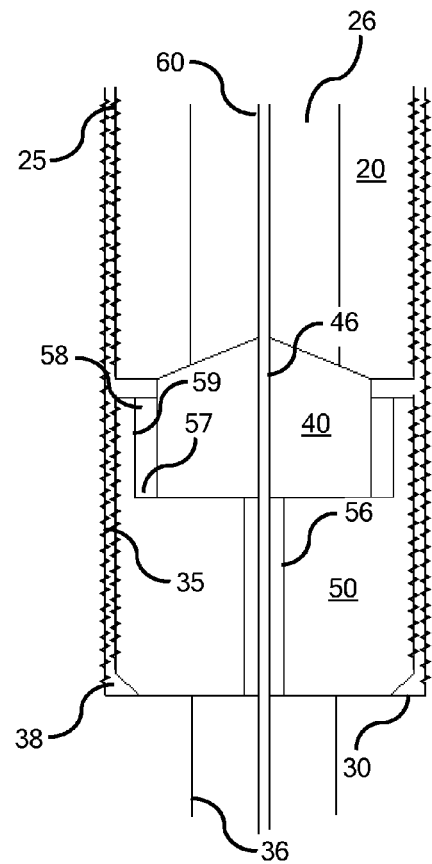

As is illustrated in FIGS. 2 and 5, the pull stud 20 comprises a threaded outside diameter 25, a tail end 22, a nose end 24, and an electrode accommodating passage 26 extending from the tail end 22 to the nose end 24 of the pull stud 20. The threaded outside diameter 26 of the pull stud 20 is suitable for threaded engagement with the threaded inside diameter 35 of the counter bore 38. The threaded inside diameter 35 of the counter bore 38 in the electrode holder 30 comprises a longitudinal threading dimension d that is sufficient to accommodate the entire longitudinal threaded outside diameter 55 of the seal holder 50 and a significant portion of the longitudinal threaded outside diameter 25 of the pull stud 20, with the fluid seal 40 positioned in the seal accommodating space 58 of the seal holder 50.

To install an electrode 60 in the spindle assembly 10, the seal holder 50, which may be a brass member, is threaded into the electrode holder 30 and the fluid seal 40, which may be a rubber seal, is placed into the seal accommodating space 58 of the seal holder 50. The electrode 60 may then be pushed through the electrode accommodating passage 46 of the fluid seal 40 or forced through the center portion of a fluid seal 40. The pull stud 20 may then be threaded into the electrode holder 30 and tightened an amount that is sufficient to secure the fluid seal 40 within the seal accommodating space 58 about an outer periphery of the electrode 60. The resulting spindle assembly 10 provides for longer seal life and relatively effortless seal replacement. The substantial contact between the respective threaded outside diameters 25, 55 of the pull stud 20 and the seal holder 50 with the common threaded inside diameter 35 of the electrode holder 30 can decrease EDM run-out and provide better continuity in the spindle assembly 10. Designs of this nature can also help eliminate problems associated with seal failure.

As is illustrated in FIG. 5, the respective dimensions of the nose end 24 of the pull stud 20 and the fluid seal 40 permit compressive contact of the nose end 24 of the pull stud 20 with the fluid seal 40. In addition, the respective dimensions of the fluid seal 40 and the seal accommodating space 58 permit radial expansion of the fluid seal 40 in the seal accommodating space 58 under compression by the nose end 24 of the pull stud 20. Further, the uncompressed fluid seal 40 is sufficiently small, relative to the seal accommodating space 58, to permit unencumbered removal of the fluid seal 40 from the seal accommodating space 58.

As is illustrated in FIG. 5, the respective dimensions of the fluid seal 40 and the seal accommodating space 58 are such that a portion of the fluid seal 40 protrudes from the tail end 52 of the seal holder 50 when the fluid seal 40 is positioned in the seal accommodating space 58. In the illustrated embodiment, this protruding portion of the fluid seal 40 includes a surface that defines a conical or frusto-conical profile to help ensure proper compressive engagement of the nose end 24 of the pull stud 20 with the fluid seal 40.

FIGS. 4-6 illustrate the seal holder 50 in detail. Generally, the seal accommodating space 58 of the seal holder 50 terminates at a substantially planar seal engaging surface 57 that is intersected by the electrode accommodating passage 56 of the seal holder 50. Similarly, the counter bore 38 formed in the tail end 32 of the electrode holder 30 comprises a counter bore terminus, which either defines a non-planar taper (see FIG. 5) or comprises a relatively large electrode accommodating passage 36 (see FIG. 6). In either case, the substantially planar seal engaging surface 57, which is intersected by a relatively small diameter electrode accommodating passage 56, provides a preferential low-wear surface against which the fluid seal 40 can be compressed. In contrast, the non-planar terminus of the counter bore 38 of the embodiment of FIG. 5 and the counter bore terminus with the relatively large electrode accommodating passage 36 of the embodiment of FIG. 6 both define relatively high-wear surfaces which would cause a high degree of seal deformation upon compression of the fluid seal 40.

Referring further to FIGS. 4-6, the interior sidewall structure of the seal holder 50, which typically comprises a cylindrical side wall 59, cooperates with the substantially planar seal engaging surface 57 of the seal holder 50 to define the seal accommodating space 58. Typically, the outside dimensions of the fluid seal 40 will complement the interior sidewall structure of the seal holder 50, e.g., if the side wall structure is cylindrical, the outside dimensions of the fluid seal 40 can be cylindrical. To ease installation and removal of the seal holder 50 from the counter bore 38 of the electrode holder 30, the seal holder 50 the interior sidewall structure of the seal holder 50 may comprise one or more pairs of longitudinal installation/removal grooves 51 that enable rotation of the seal holder 50 about a longitudinal axis of the electrode accommodating passage 56 of the seal holder 50.

It is noted that terms like "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An electrical discharge machining spindle assembly comprising:
   a pull stud, an electrode holder, a fluid seal, and a seal holder, wherein;
      the electrode holder comprises a tail end, a nose end, and an electrode accommodating passage extending from the tail end to the nose end of the electrode holder;
      the electrode holder further comprises a counter bore comprising a threaded inside diameter in the tail end of the electrode holder aligned with the electrode accommodating passage of the electrode holder;
      the seal holder comprises a threaded outside diameter, a tail end, a nose end, and an electrode accommodating passage extending from the tail end to the nose end of the seal holder;
      the seal holder further comprises a seal accommodating space in the tail end of the seal holder aligned with the electrode accommodating passage of the seal holder;
      the threaded outside diameter of the seal holder is threadedly engaged with the threaded inside diameter of the counter bore;
      the pull stud comprises a threaded outside diameter, a tail end, a nose end, and an electrode accommodating passage extending from the tail end to the nose end of the pull stud;
      the threaded outside diameter of the pull stud is threadedly engaged with the threaded inside diameter of the counter bore; and
      the threaded inside diameter of the counter bore in the electrode holder comprises a longitudinal threading dimension that is sufficient to accommodate the entire longitudinal threaded outside diameter of the seal holder and a portion of the longitudinal threaded outside diameter of the pull stud sufficient to create threaded engagement, with the fluid seal positioned in the seal accommodating space.

2. An assembly as claimed in claim 1 wherein respective dimensions of the nose end of the pull stud and the fluid seal permit compressive contact of the nose end of the pull stud with the fluid seal.

3. An assembly as claimed in claim 1 wherein respective dimensions of the fluid seal and the seal accommodating space permit radial expansion of the fluid seal in the seal accommodating space under compression by the nose end of the pull stud.

4. An assembly as claimed in claim 1 wherein respective dimensions of the fluid seal and the seal accommodating space permit unencumbered removal of the fluid seal from the seal accommodating space.

5. An assembly as claimed in claim 1 wherein respective dimensions of the fluid seal and the seal accommodating space are such that a portion of the fluid seal protrudes from the tail end of the seal holder when the fluid seal is positioned in the seal accommodating space.

6. An assembly as claimed in claim 5 wherein a surface of the protruding portion of the fluid seal defines a conical or frusto-conical profile.

7. An assembly as claimed in claim 5 wherein respective dimensions of the nose end of the pull stud and the protruding portion of the fluid seal permit compressive contact of the nose end of the pull stud with the protruding portion of the fluid seal.

8. An assembly as claimed in claim 1 wherein the seal accommodating space of the seal holder terminates at a substantially planar seal engaging surface intersected by the electrode accommodating passage of the seal holder.

9. An assembly as claimed in claim 8 wherein the seal holder comprises an interior sidewall structure cooperating with the substantially planar seal engaging surface of the seal holder to define the seal accommodating space.

10. An assembly as claimed in claim 9 wherein the outside dimensions of the fluid seal complement the interior sidewall structure of the seal holder.

11. An assembly as claimed in claim 8 wherein the seal holder comprises a substantially cylindrical interior sidewall structure cooperating with the substantially planar seal engaging surface of the seal holder to define the seal accommodating space.

12. An assembly as claimed in claim 1 wherein the seal accommodating space of the seal holder comprises an interior sidewall structure comprising one or more pairs of longitudinal installation/removal grooves that enable rotation of the seal holder about a longitudinal axis of the electrode accommodating passage of the seal holder.

13. An assembly as claimed in claim 1 wherein the fluid seal comprises an electrode accommodating passage extending along a longitudinal axis of the fluid seal.

14. An assembly as claimed in claim 1 wherein:
the counter bore formed in the tail end of the electrode holder comprises a counter bore terminus;
the electrode accommodating passage of the seal holder terminates at a seal engaging surface within the seal accommodating space; and
the planarity of the seal engaging surface exceeds that of the counter bore terminus.

15. An assembly as claimed in claim 1 wherein:
the counter bore formed in the tail end of the electrode holder comprises a counter bore terminus;
the electrode accommodating passage of the seal holder terminates at a seal engaging surface within the seal accommodating space;
the size of the electrode accommodating passage at the seal engaging surface of the seal holder is less than the size of the electrode accommodating passage at the counter bore terminus.

16. An electrical discharge machining spindle assembly comprising:
a pull stud, an electrode holder, an fluid seal, and a seal holder, wherein:
the electrode holder comprises a tail end, a nose end, and an electrode accommodating passage extending from the tail end to the nose end of the electrode holder;
the electrode holder further comprises a counter bore comprising a threaded inside diameter in the tail end of the electrode holder aligned with the electrode accommodating passage of the electrode holder;
the fluid seal comprises an electrode accommodating passage extending along a longitudinal axis of the fluid seal;
the seal holder comprises a threaded outside diameter, a tail end, a nose end, and an electrode accommodating passage extending from the tail end to the nose end of the seal holder;
the seal holder further comprises a seal accommodating space in the tail end of the seal holder aligned with the electrode accommodating passage of the seal holder;
respective dimensions of the fluid seal and the seal accommodating space permit unencumbered removal of the fluid seal from the seal accommodating space;
the threaded outside diameter of the seal holder is threadedly engaged with the threaded inside diameter of the counter bore;
the pull stud comprises a threaded outside diameter, a tail end, a nose end, and an electrode accommodating passage extending from the tail end to the nose end of the pull stud;
the threaded outside diameter of the pull stud is threadedly engaged with the threaded inside diameter of the counter bore;
the threaded inside diameter of the counter bore in the electrode holder comprises a longitudinal threading dimension that is sufficient to accommodate the entire longitudinal threaded outside diameter of the seal holder and a portion of the longitudinal threaded outside diameter of the pull stud sufficient to create threaded engagement, with the fluid seal positioned in the seal accommodating space; and
respective dimensions of the nose end of the pull stud, the fluid seal, and the seal accommodating space permit compressive contact of the nose end of the pull stud with the fluid seal and radial expansion of the fluid seal in the seal accommodating space under compression by the nose end of the pull stud.

17. An electrical discharge machining spindle assembly comprising:
a pull stud, an electrode holder, a fluid seal, and a seal holder, wherein:
the electrode holder comprises a tail end, a nose end, and an electrode accommodating passage extending from the tail end to the nose end of the electrode holder;
the electrode holder further comprises a counter bore in the tail end of the electrode holder aligned with the electrode accommodating passage of the electrode holder;
the seal holder comprises a tail end, a nose end, and an electrode accommodating passage extending from the tail end to the nose end of the seal holder;
the seal holder is disposed within the counter bore;
the seal holder further comprises a seal accommodating space in the tail end of the seal holder aligned with the electrode accommodating passage of the seal holder;
the pull stud comprises a tail end, a nose end, and an electrode accommodating passage extending from the tail end to the nose end of the pull stud;

the pull stud is disposed within the counter bore adjacent the fluid seal disposed in the seal accommodating space;

the counter bore in the electrode holder comprises a longitudinal dimension that is sufficient to accommodate the entire longitudinal dimension of the seal holder and a portion of the pull stud sufficient to create threaded engagement, with the fluid seal positioned in the seal accommodating space.

* * * * *